United States Patent
Rijken et al.

(10) Patent No.: US 10,891,247 B2
(45) Date of Patent: Jan. 12, 2021

(54) HARDWARE COMPONENT DETECTIONS

(71) Applicant: Hewlett-Packard Development Company, L.P., Spring, TX (US)

(72) Inventors: Christopher Rijken, Houston, TX (US); Chih Liang Li, Taipei (TW); Ronald E. Deluga, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,873

(22) PCT Filed: Jun. 21, 2017

(86) PCT No.: PCT/US2017/038424
§ 371 (c)(1),
(2) Date: Jul. 30, 2019

(87) PCT Pub. No.: WO2018/236363
PCT Pub. Date: Dec. 27, 2018

(65) Prior Publication Data
US 2020/0110718 A1    Apr. 9, 2020

(51) Int. Cl.
*G06F 13/36* (2006.01)
*G06F 13/12* (2006.01)
*G06F 13/42* (2006.01)

(52) U.S. Cl.
CPC ............ *G06F 13/36* (2013.01); *G06F 13/124* (2013.01); *G06F 13/4221* (2013.01); *G06F 13/4295* (2013.01)

(58) Field of Classification Search
CPC .... G06F 13/36; G06F 13/124; G06F 13/4221; G06F 13/4295
See application file for complete search history.

(56) References Cited

U.S. PATENT DOCUMENTS

| | | |
|---|---|---|
| 6,279,146 B1 | 8/2001 | Evans et al. |
| 6,587,909 B1 | 7/2003 | Olarig et al. |
| 7,388,744 B2 | 6/2008 | Chu |

(Continued)

FOREIGN PATENT DOCUMENTS

CN    102368224    3/2012

OTHER PUBLICATIONS

3-Series® 4K DigitalMedia™ Presentation System 300, Jan. 18, 2017.

*Primary Examiner* — Henry Tsai
*Assistant Examiner* — Christopher A Daley
(74) *Attorney, Agent, or Firm* — Tong Rea Bentley & Kim LLC (US LC)—USD

(57) ABSTRACT

In example implementations, an apparatus for detecting hardware components is provided. The apparatus includes a multipurpose integrated circuit comprising an input pin, a hardware component coupled to the input pin and a two-way communication bus coupled to the multipurpose integrated circuit. The multipurpose integrated circuit is to receive an interrogation signal from a processor for the hardware component coupled to the pin via the two-way communication bus. A response signal that indicates that the hardware component is detected on the pin is generated in response to the interrogation signal. The response signal is then transmitted to the processor over the two-way communication bus.

15 Claims, 4 Drawing Sheets

(56) References Cited

U.S. PATENT DOCUMENTS

| | | | |
|---|---|---|---|
| 7,925,728 B2 * | 4/2011 | Atkins | H04L 43/0811 |
| | | | 709/223 |
| 9,065,937 B2 | 6/2015 | Liang | |
| 9,426,930 B2 | 8/2016 | Atkinson | |
| 9,430,001 B2 | 8/2016 | Kim et al. | |
| 10,032,019 B2 * | 7/2018 | Allison | G06F 21/79 |
| 10,181,174 B2 * | 1/2019 | Koo | G06F 13/409 |
| 2007/0100598 A1 | 5/2007 | Zeidman | |
| 2017/0364463 A1 * | 12/2017 | Chen | G06F 1/3215 |

* cited by examiner

HARDWARE COMPONENT DETECTIONS

BACKGROUND

All-in-one computing systems are gaining popularity due to the compact overall design and functionality. For example, connections between the monitor, processor, and hardware components are made within the housing of the all-in-one computing system. As a result, the physical wiring and connections that can clutter a separated computer and monitor may be hidden.

As the all-in-one computing system evolves, updated designs are separating the monitor and some associated hardware components from a base that includes the main processor. This separated design prevents certain components from becoming obsolete over time or allowing the all-in-one computing system to still be used if the monitor fails.

DETAILED DESCRIPTION

Examples described herein provide methods to detect remote hardware components and a computing device to perform the same. As discussed above, as the all-in-one computing system evolves, updated designs are separating the monitor and some associated hardware components from a base that includes the main processor. This separated design prevents certain components from becoming obsolete over time or allowing the all-in-one computing system to still be used if the monitor fails.

However, to keep the sleek design and aesthetic appeal of the all-in-one computing system, the connection between the base component and the monitor has been kept as small as possible. The neck between the base component and the monitor has limited space to make connections between components in the monitor and a main processor located in the base component. In previous all-in-one computing system designs, the hardware components for the monitor and the main processor were located together in a common housing. Thus, each hardware component could be directly coupled to the main processor. However, with the limited space in the neck in the updated designs of the all-in-one computing system, the wiring for individual connections of each hardware component to the main processor may not be available.

Examples described herein provide an apparatus that allows hardware components in a display component that are located remotely from a base component that includes the main processor to be detected by the processor. The detection may be performed without having each hardware component in the display component individually coupled to, or connected to, the main processor. Rather, the present disclosure uses available general input pins of a microchip in the display component to connect each hardware component in the display component. A two-way communication bus between the microchip in the display component and the processor in the base component may be used to communicate query signals and response signals indicating whether the hardware components in the display component are detected and configured properly.

Figure 1:
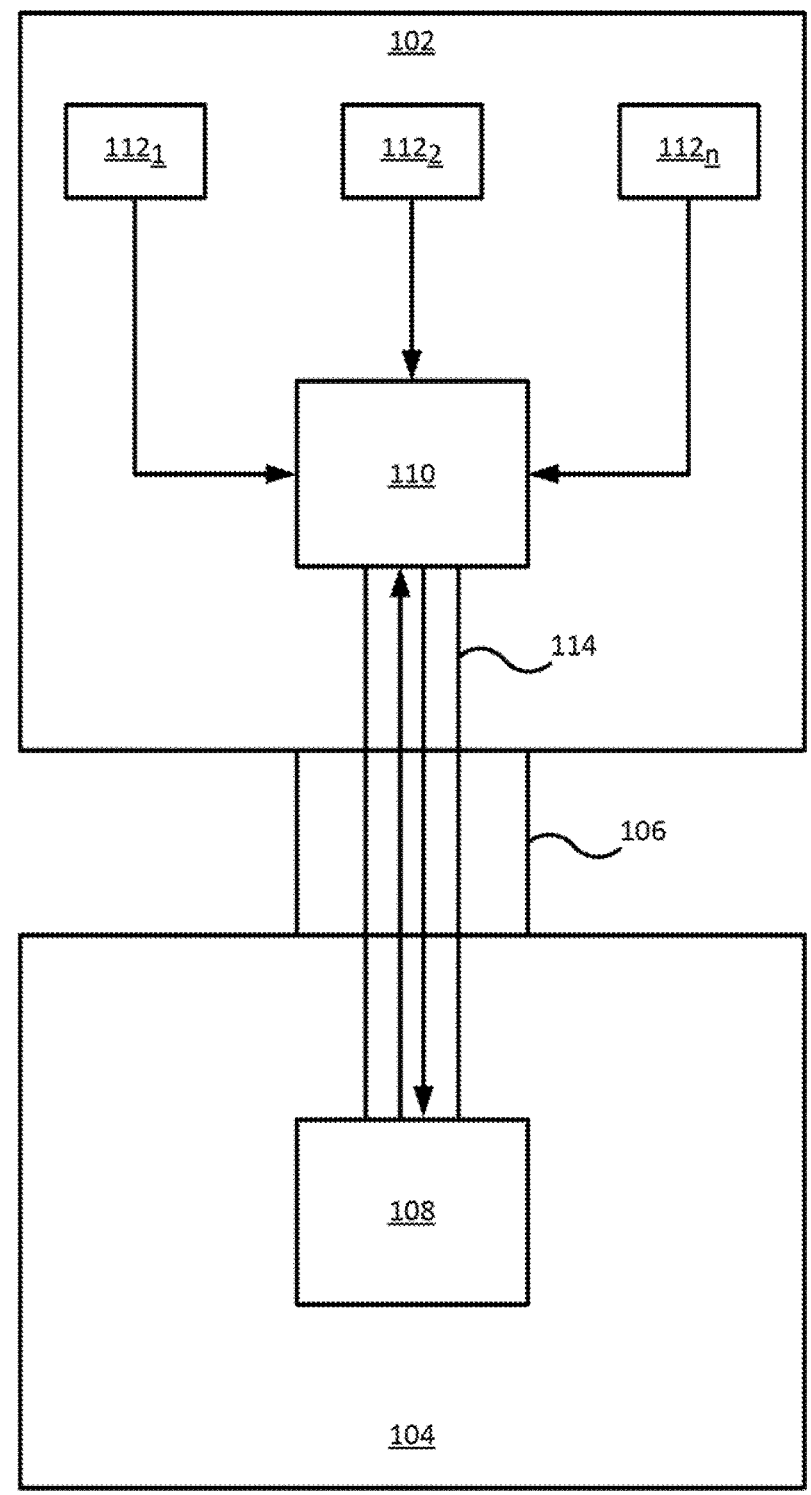
FIG. 1 is a block diagram of an example computing system with remote hardware components.

FIG. 1 illustrates a block diagram of a computing system 100. The computing system 100 may be an all-in-one computing system that includes a display component 102, a base component 104 and a connection component 106. The display component 102 and the base component 104 may be coupled together via the connection component 106. Physical connections and wiring used to connect components in the display component 102 to components in the base component 104 are run through the connection component 106.

In one example, an all-in-one computing system may be defined as a computing system where the display, or monitor, is coupled to a base and physical wiring used to connect the display to the base are not visible. In other words, physical connections between the display and the base are located within the housing of the display component 102, the base component 104 and the connection component 106.

In one implementation, the display component 102 may include a microchip 110 and a hardware component 112, or a plurality of hardware components $112_1$ to $112_n$ (herein also referred to collectively as hardware components 112). In one example, the microchip 110 may also be referred to as a multipurpose integrated circuit 110. The microchip 110 may be a scalar chip used in monitors.

In one example, the hardware components 112 may be hardware components 112 that are used to perform functions associated with the display component 102. For example, the hardware components 112 may include components such as a red, green, blue (RGB) camera, a front facing camera, an infrared (IR) camera, a touch module for touch screen displays, an audio interface, a microphone, an external speaker, a sensor (e.g., a presence sensor), and the like.

The hardware components 112 may be located remotely from the base component 104. For example, "located remotely" for the present disclosure may be defined as being located in a separate housing, but being part of the same computing system. For example, the housing of the display component 102 may be separate from the housing of the base component 104. However, the display component 102 may be connected to the base component 104 via the connection component 106 to form the all-in-one computing system such as the computing system 100.

Moreover, "remotely located hardware components" in the present disclosure may be defined as hardware components that are located in the housing of one component that is separate from the housing of another component, but part of the same computing system. In other words, the "remotely located hardware components" may be physically connected (e.g., via a cable or internal circuitry) to another component that is located in a separate housing of the same computing system. The "remotely located hardware components" may communicate with the other component that is located in a separate housing via the physical connection and without communicating over a communication network (e.g., the Internet, a local area network (LAN), a wide area network (WAN), an Internet protocol (IP) network, an Ethernet network, a cellular network, and the like). Said another way, the term "remotely located hardware components" does not necessarily include independent computing systems that are located apart from other independent computing systems that communicate with one another over a communication network.

In one example, the base component 104 may include a processor 108. The processor 108 may be in communication with the display component 102 via a two-way communication bus 114. The two-way communication bus 114 may be a two-wire bus that runs through the connection component 106. The two-way communication bus 114 provides a communication path to allow data, or communication signals, to be exchanged between the processor 108 and the microchip 110.

Locating the hardware components 112 remotely from the base component 104 may allow the display component 102 or the base component 104 to be replaced separately. For example, if the display component 102 fails, the display component 102 may be replaced rather than replacing the entire computing system 100. In another example, if the processor 108 becomes outdated, the base component 104 can be replaced without replacing the entire computing system 100.

It should be noted that FIG. 1 has been simplified for ease of explanation and that additional components and circuitry may be included in the computing system 100 that are not shown. For example, the base component 104 may include computer readable memory, graphics cards, motherboards, power supplies, external connection interfaces (e.g., universal serial bus (USB) interfaces), the display component may also include computer readable memory in communication with the microchip 110, motherboards, power supplies, and the like.

In one implementation, due to the limited space available in the connection component 106, the processor 108 may not be individually coupled to the hardware components 112 that are remotely located in the display component 102. In other words, if there are ten different hardware components 112, the connection component 106 may not provide enough space for ten different physical wires or circuit connections between the processor 108 and the ten different hardware components 112.

The design of the present disclosure allows the processor 108 to detect the hardware components 112 without having individual connections to each one of the hardware components 112 via a query signal that is transmitted via the two-way communication bus 114 to the microchip 110. In some implementations, the processor 108 may receive additional information associated with each hardware component 112 from the microchip 110 related to configuration information of each hardware component 112.

Figure 2:
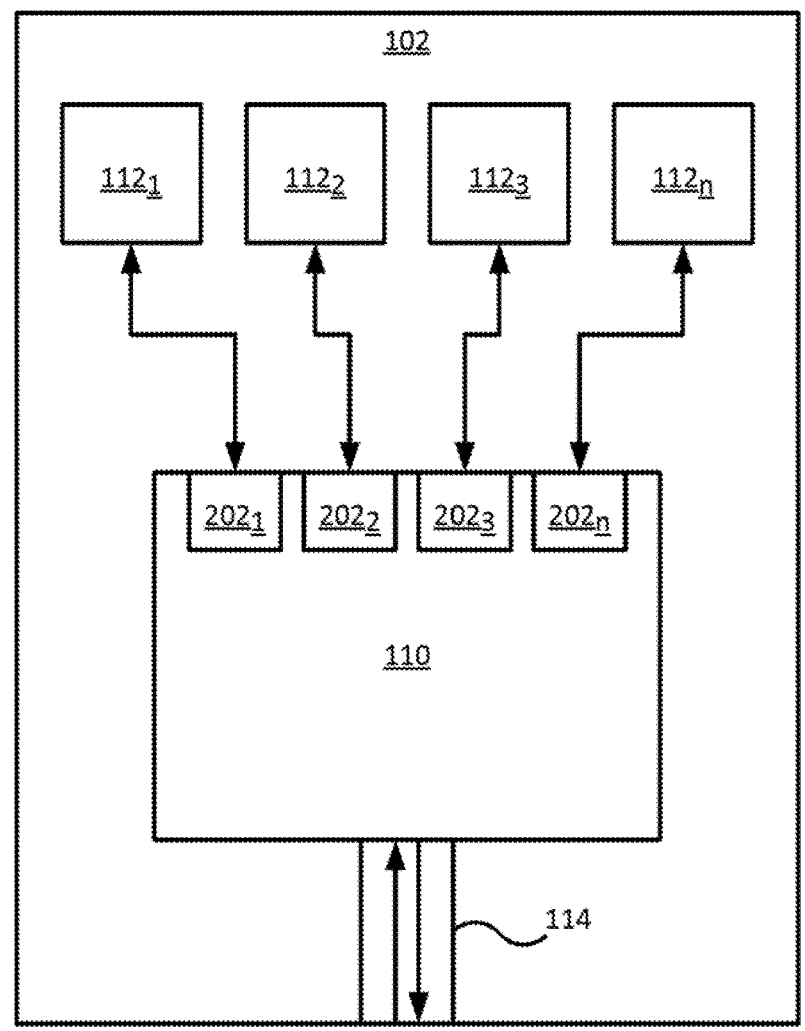
FIG. 2 is a block diagram of an example display component that includes a multipurpose integrated circuit with hardware components.

FIG. 2 illustrates a block diagram of the display component 102 that illustrates in further detail how the hardware components 112 are coupled to the microchip 110. As noted above, the display component 102 may include the microchip 110 and the hardware components 112. In addition, the microchip 110 may be in communication with the processor 108 in the base component 104 via the two-way communication bus 114.

In one example, the microchip 110 may include a plurality of input pins $202_1$ to $202_n$ (hereinafter referred to individually as an input pin 202 or collectively as input pins 202). It should be noted that although FIG. 2 illustrates the same number of input pins 202 as hardware components 112 that the number of input pins 202 and the hardware components 112 may be different. For example, there may be three hardware components 112 and four input pins 202. Thus, one input pin would remain open.

In one example, the input pins 202 may be general purpose input pins that are unused or available on the microchip 110. For example, a scalar chip of a monitor in the display component 102 may have input pins that are available. The available input pins 202 may be used to connect to the hardware components 112 and allow the microchip 110 to obtain information associated with the hardware components. For example, each hardware component $112_1$ to $112_n$ may be coupled to a different one of the input pins $202_1$ to $202_n$.

In one example, the display component 102 may also include a computer readable memory (not shown) that is in communication with the microchip 110. The information associated with the hardware components may be stored in the computer readable memory.

Figure 3:
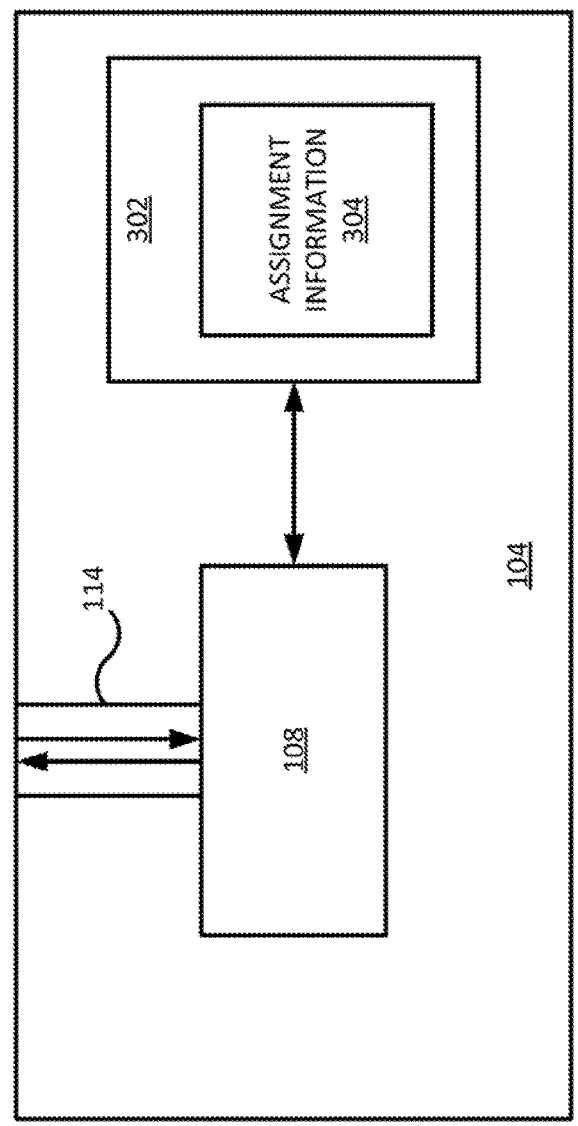
FIG. 3 is a block diagram of a base component that is remotely located from the display component.

FIG. 3 illustrates a block diagram of the base component 104. As noted above, the base component 104 may include the processor 108 that communicates with the microchip 110 via the two-way communication bus 114. In addition, the base component 104 may include a computer readable memory 302 (e.g., a non-transitory computer readable medium) that stores assignment information 304.

In one example, the assignment information 304 may store the assignments between a hardware component 112 and an input pin 202 of the microchip 110. The assignment information 304 may be stored in the computer readable memory 302 after the hardware components 112 are coupled to respective input pins 202 during assembly of the computing system 100. The assignment information 304 may provide information to the processor 108 regarding which hardware component 112 should be connected to which input pin 202 of the microchip 110. In other implementations, the assignment information 304 may also be stored in a computer readable memory located in the display component 102 and in communication with the microchip 110.

As noted above, the processor 108 may transmit a query signal to the microchip 110 to interrogate a pin 202. The query signal may be based on the assignment information 304. For example, the assignment information 304 may indicate that the hardware component $112_1$ should be connected to the input pin $202_1$. The processor 108 may send the query signal to the microchip 110.

In one example, the microchip 110 may generate a response signal in response to the query signal. For example, the microchip 110 may interrogate the input pin $202_1$ to detect if a hardware component 112 is connected to the input pin $202_1$. The microchip 110 may also communicate with the hardware component 112 to verify that it is the hardware component $112_1$ coupled to the input pin $202_1$. The response signal may be a binary signal that indicates a yes (e.g., a confirmation that the hardware component $112_1$ is detected and coupled to the input pin $202_1$ as indicated in the assignment information 304) or a no (e.g., an indication that the hardware component $112_1$ is not detected on the input pin $202_1$) to the processor 108.

In another example, the response signal may include detailed information associated with the hardware component 112. The detailed information may include a name of the hardware component 112, a software version of the hardware component 112, configuration parameters of the hardware component 112, and the like. For example, the microchip 110 may be in communication with a memory that stores the detailed information associated with the hardware component 112. In response to the query signal, the microchip 110 may confirm that the hardware component $112_1$ is detected on the input pin $202_1$. The microchip 110 may look-up the detailed information associated with the hardware component $112_1$ in memory and include the detailed information in the response signal to the processor 108.

The query signal and the response signal may be repeated for each hardware component $112_1$ to $112_n$. For example, after assembly of the computing system 100 a technician may want to verify that all of the hardware components $112_n$ were correctly installed. The process described above may be initiated by the technician on a user interface (e.g., a keyboard coupled to the base component 104 or a touch screen display of the display component 102) of the computing system 100 to detect each hardware component $112_1$ to $112_n$ by querying each respective pin 202 of the microchip 110 based on the assignment information 304.

Thus, the present disclosure provides a design that allows the processor 108 in a base component 104 to detect the hardware components 112 that are remotely located in the display component 102 of the computing system 100. Notably, the processor 108 may detect the remotely located hardware components 112 without having individual connections to each one of the hardware components 112.

Figure 4:
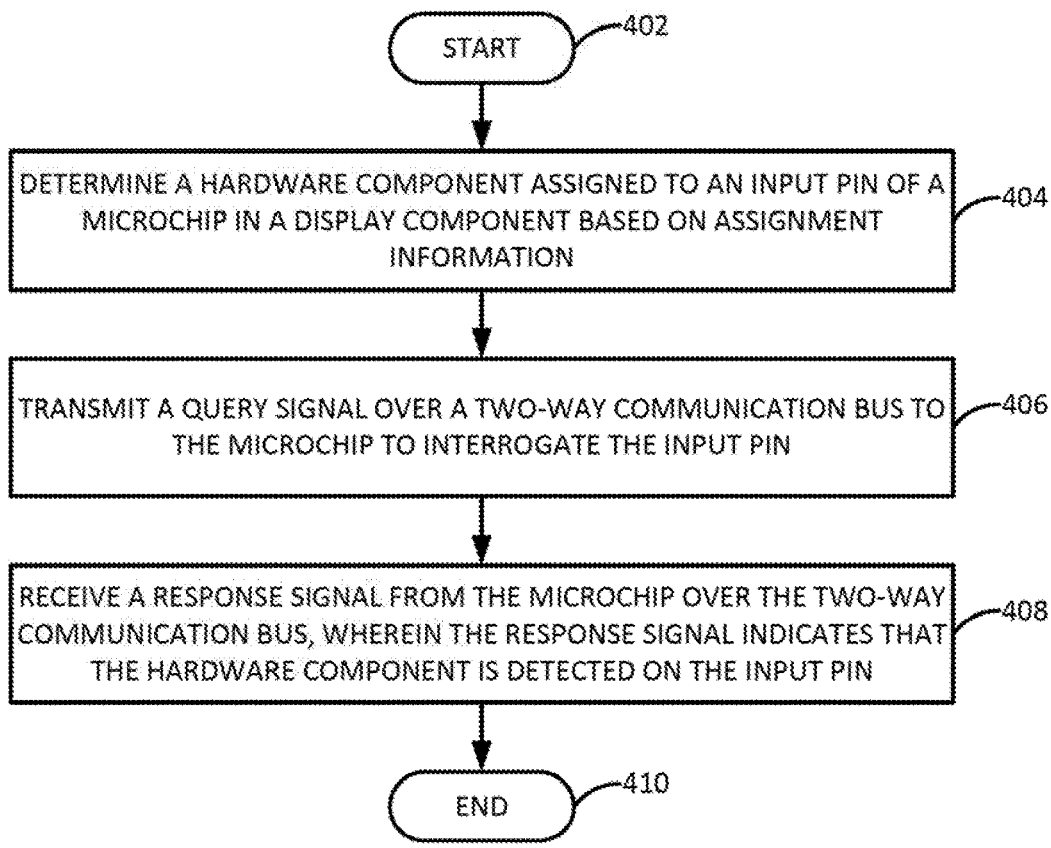
FIG. 4 is a flow chart of an example method for detecting remote hardware components in a computing system.

FIG. 4 illustrates a flow diagram of an example method 400 for detecting hardware components in a computing system. In one example, the method 400 may be performed by the processor 108.

At block 402, the method 400 begins. At block 404, the method 400 determines a hardware component assigned to an input pin of a microchip in a display component based on assignment information. For example, when an all-in-one computing system is assembled, the hardware components of the display component may be coupled to different pints of the microchip. A first hardware component may be coupled to a first input pin, a second hardware component may be coupled to a second input pin, and so forth, until each hardware component is coupled to the microchip via respective input pins.

The assignments between a hardware component and a respective input pin may be stored in the assignment information. The assignment information may inform the processor regarding which hardware component should be detected on which input pins of the microchip.

At block 406, the method 400 transmits a query signal over a two-way communication bus to the microchip to interrogate the input pin. The query signal may cause the microchip to interrogate the input pin in response to the query signal to determine if the hardware component identified in the query signal is detected on the input pin.

At block 408, the method 400 receives a response signal from the microchip over the two-way communication bus, wherein the response signal indicates that the hardware component is detected on the input pin. In one example, the response signal may be a binary signal (e.g., a 0 or a 1, a yes or a no, etc.). The binary signal may simply indicate whether the hardware component is detected or not.

In another example, the response signal may contain detailed information associated with the hardware component. For example, the response signal may indicate that the hardware component is detected and include detailed information such as, a name of the hardware component, a software version of the hardware component, configuration parameters of the hardware component, and the like.

In one example, the method 400 may be repeated for each hardware component listed in the assignment information. At block 410, the method 400 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
   a multipurpose integrated circuit comprising an input pin;
   a hardware component coupled to the input pin; and
   a two-way communication bus coupled to the multipurpose integrated circuit within a connecting component that is to connect the hardware component and a base component, wherein the hardware component, the connecting component, and the base component are part of an all-in-one computer, wherein the multipurpose integrated circuit is to:
      receive an interrogation signal from a processor in the base component for the hardware component coupled to the pin via the two-way communication bus;
      generate a response signal that indicates that the hardware component is detected on the pin in response to the interrogation signal; and
      transmit the response signal to the processor via the two-way communication bus.

2. The apparatus of claim 1, wherein the multipurpose integrated circuit comprises a scalar chip in a monitor.

3. The apparatus of claim 1, wherein the input pin is one of a plurality of input pins and the hardware component is one of a plurality of hardware components, wherein each one of the plurality of hardware components is coupled to a different one of the plurality of input pins.

4. The apparatus of claim 1, wherein the interrogation signal is received from a processor that is located remotely from the multipurpose integrated circuit.

5. The apparatus of claim 1, comprising:
   a memory storing assignment information and hardware information associated with the hardware component, wherein the assignment information comprises assignments between the hardware component and the input pin, wherein the response signal includes the hardware information.

6. An apparatus, comprising:
   a memory to store assignment information between a hardware component and an input pin of a microchip;
   a two-way communication bus within a connecting component that is to connect the hardware component and a base component, wherein the hardware component, the connecting component, and the base component are part of an all-in-one computer; and
   a processor located in the base component, wherein the processor is in communication with the memory and coupled to the two-way communication bus, wherein the processor is to transmit a query signal over the two-way communication bus to the microchip to detect the hardware component coupled to the input pin based on the assignment information.

7. The apparatus of claim 6, wherein the hardware component and the microchip are located in a display located remotely from the apparatus.

8. The apparatus of claim 6, wherein the processor is to receive a response signal from the microchip via the two-way communication bus, wherein the response signal indicates that the hardware component is detected.

9. The apparatus of claim 8, wherein the response signal comprises a binary signal indicating that the input pin is active or inactive.

10. The apparatus of claim 8, wherein the response signal comprises data associated with the hardware component that is assigned to the input pin.

11. An apparatus, comprising:
- a display component, wherein the display component comprises a microchip and a hardware component coupled to the microchip;
- a base component, wherein the base component comprises a processor; and
- a connection component coupling the display component to the base component as part of an all-in-one computer, wherein the connection component comprises a two-way communication bus that provides a communication path between the microchip and the processor, wherein the processor communicates with the microchip over the two-way communication bus to detect the hardware component.

12. The apparatus of claim 11, wherein the microchip comprises a plurality of input pins, wherein the hardware component is assigned to one of the plurality of input pins.

13. The apparatus of claim 12, wherein the base component comprises a memory, wherein the memory stores assignment information of the hardware component to the one of the plurality of input pins.

14. The apparatus of claim 13, wherein the processor communicates with the microchip over the two-way communication bus in the connection component to interrogate the one of the plurality of input pins to detect the hardware component based on the assignment information.

15. The apparatus of claim 11, wherein the display component comprises a memory, wherein the microchip is in communication with the memory and stores data associated with the hardware component assigned to a respective input pin of the microchip.

* * * * *